No. 692,052. Patented Jan. 28, 1902.
F. L. FORSTER.
LOCK OR CLUTCH FOR SECTIONAL CASES.
(Application filed July 3, 1901.)
(No Model.)

WITNESSES:
C. H. Walker.
H. H. Johnson.

INVENTOR.
Frank L. Forster,
BY Eugene H. Johnson.
Attorney

UNITED STATES PATENT OFFICE.

FRANK L. FORSTER, OF SHELBYVILLE, INDIANA, ASSIGNOR OF ONE-HALF TO JACOB A. CONREY, OF SHELBYVILLE, INDIANA.

LOCK OR CLUTCH FOR SECTIONAL CASES.

SPECIFICATION forming part of Letters Patent No. 692,052, dated January 28, 1902.

Application filed July 3, 1901. Serial No. 66,991. (No model.)

*To all whom it may concern:*

Be it known that I, FRANK L. FORSTER, a citizen of the United States, residing at Shelbyville, in the county of Shelby and State of Indiana, have invented new and useful Improvements in Locks or Clutches for Sectional Cases, of which the following is a specification.

This invention appertains to certain new and useful improvements in end locks for sectional or separable cases; and it consists in the means used for fastening such cases together end for end, the make-up of the device being such that there are no exterior protruding parts when the cases are separated, the fastening means being projected so that one part will interlock with the other when the sections are placed end for end, as will hereinafter more fully appear.

Figure 1:
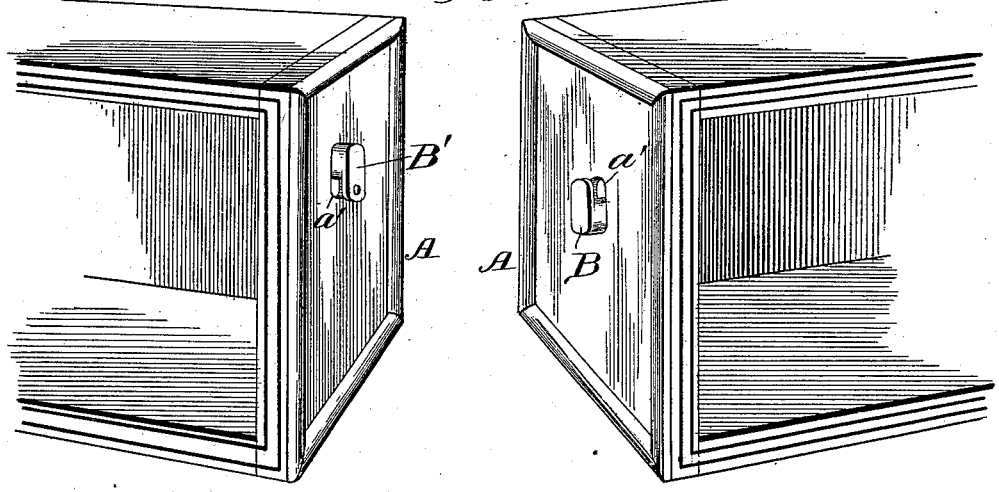
Figure 2:
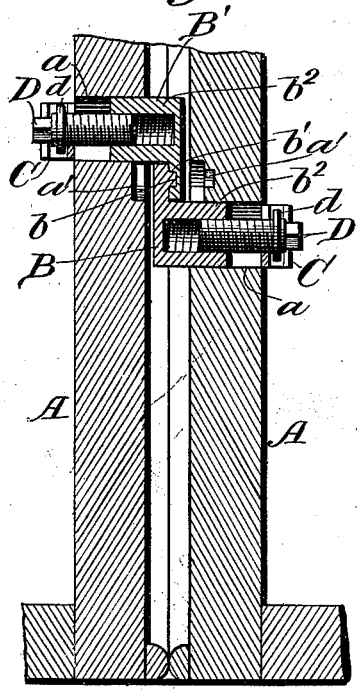
Figure 3:
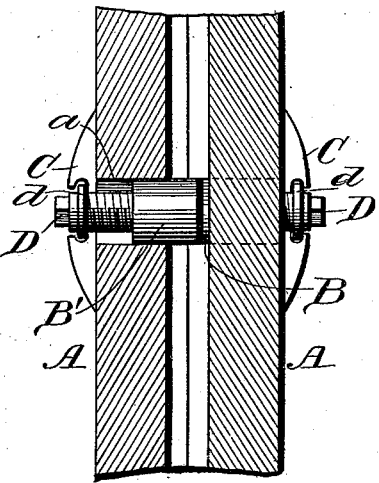
Figure 4:
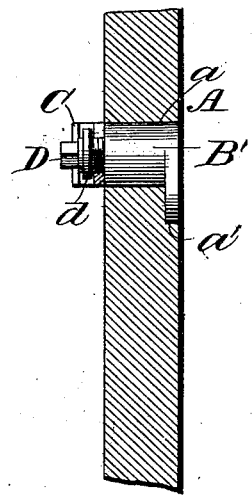

In the accompanying drawings, which form a part of this specification, Figure 1 is a view showing the ends of cases having my improvements applied thereto, the cases being separated. Fig. 2 is a vertical sectional view through the ends of a pair of cases, showing the position of the parts when they are locked together. Fig. 3 is a horizontal sectional view, and Fig. 4 a vertical sectional view, through the end of one of the cases.

Reference being had to the drawings, A indicates one of the ends of a sectional case, such as may be used for holding books and other articles, and such end A has an aperture $a$ bored therethrough, and on the outer side there is an extension or recess $a'$.

B refers to one of the clutches, the outer or exterior configuration thereof corresponding with the shape of the opening $a$ and its recess $a'$. On one end of the case there is a male clutch B and on the other a female clutch B', the male clutch having a lug or projection $b$ and the female clutch a recess or aperture $b'$. These clutches are otherwise identical in construction, each being provided with a projecting portion $b^2$, which is interiorly screw-threaded.

C refers to bridge-pieces, which are attached to the inner sides of the end pieces of the cases and carry bolts D, having circumferential flanges $d$, which lie partially within the bridge-pieces, so that the bolts will be retained thereby. The outer ends of said bolts are key-ended, while the other end is threaded for engagement with the internally-threaded apertures in the clutch-sections.

When the bolts are tightened, they will draw the clutch-sections into the recesses which have been previously formed in the end of the case, and thus there will be no protruding parts when the sections of the clutches are not in use, and in order to connect two sections endwise it is only necessary to turn the bolts so as to force the clutch ends outward, and then these clutches can be placed one in engagement with the other and will draw, when the bolts are turned, the sections together and provide a perfect lock. In practice the ends of the cases may have a projecting molding at the margins thereof, and the apertures through the end pieces of the cases may be of such size that the clutches may have a slight play in any direction desired, which will admit of drawing the cases close together without regard to the alinement of the base or supporting means therefor. The bridge-piece will hold the bolt against displacement, and a suitable key is provided for turning the bolts.

The device hereinbefore described is susceptible of modification as to the construction and arrangement of the parts.

In attaching the clutch to a case I prefer to attach the male clutch so that it will project upward, the projecting portion of the female clutch at the other end of the case being at a slightly-higher elevation and extending downward, so that when the interlocking ends are placed in engagement the pin or projection $b$ may enter the recess or perforation in the projecting end of the female section of the clutch. As the outer faces of the clutch-sections do not come in engagement one with the other, they may be ornamented or decorated or even veneered to correspond with the ends of the cases to which they are applied.

Having thus described my invention, what I claim as new, and desire to secure by Letters Patent, is—

1. In a device for connecting the ends of two cases together, the combination of two similarly-constructed clutch-sections which when placed one in engagement with the other will interlock, one of the clutch-sections being connected to the end of one case and the other to another case, key-ended bolts having threads thereon the bolts being attached to the inner sides of the cases to engage threaded sockets in the clutch-section, whereby when the bolts are turned they will project or retract the clutches.

2. In combination with a plurality of cases, the ends of each case having openings, and adjacent to such openings recesses, of clutch-sections having threaded sockets which enter the openings and projecting portions which are adapted to lie in the recesses, a bridge-piece attached to the inner side of each case to span the opening therein, and threaded bolts which are held against longitudinal movement by engagement with the bridge-pieces, the threaded portions of the bolts engaging threaded sockets in the clutch-sections, substantially as shown.

3. A case for books or other articles comprising a plurality of sections, each section having end pieces with projecting marginal moldings, openings through the end pieces and recesses in the outer faces of the end pieces which are adjacent to said openings, clutch-sections shaped to correspond with the shape of the openings and recesses, the parts which correspond as to shape with the recesses being adapted to be placed in engagement one with the other when projected beyond the recesses, and bolts with threaded ends attached to the inner sides of the end pieces of the cases, bridge-pieces also attached to the inner sides of the end pieces of the cases to hold the bolts against longitudinal movement, the threaded ends of the bolts engaging the clutch-sections, substantially as shown.

4. In a sectional book or other case, the combination with the ends of sections having apertures which are out of line one with the other, of male and female clutch-sections shaped to fit within the apertures, bolts attached to the inner sides of the end sections, bridge-pieces which span the aperture and hold the bolts against longitudinal movement said bolts also engaging the clutch-sections, substantially as shown.

5. The combination with sections of a case for books or other articles having apertures through and recesses in the end pieces of such cases, of male and female clutch-sections each having internally-threaded sockets and projecting portions which interlock when projected beyond the plane of the ends of the cases, bridge-pieces which span the apertures through the end pieces of the cases, and bolts having circumferential flanges which engage the bridge-pieces, the bolts also engaging the threaded sockets of the clutch-sections, substantially as shown.

In testimony whereof I have hereunto set my hand in presence of two subscribing witnesses.

FRANK L. FORSTER.

Witnesses:
 DAVID L. CONREY,
 GARNETT R. FLEMING.